(No Model.) 2 Sheets—Sheet 2.

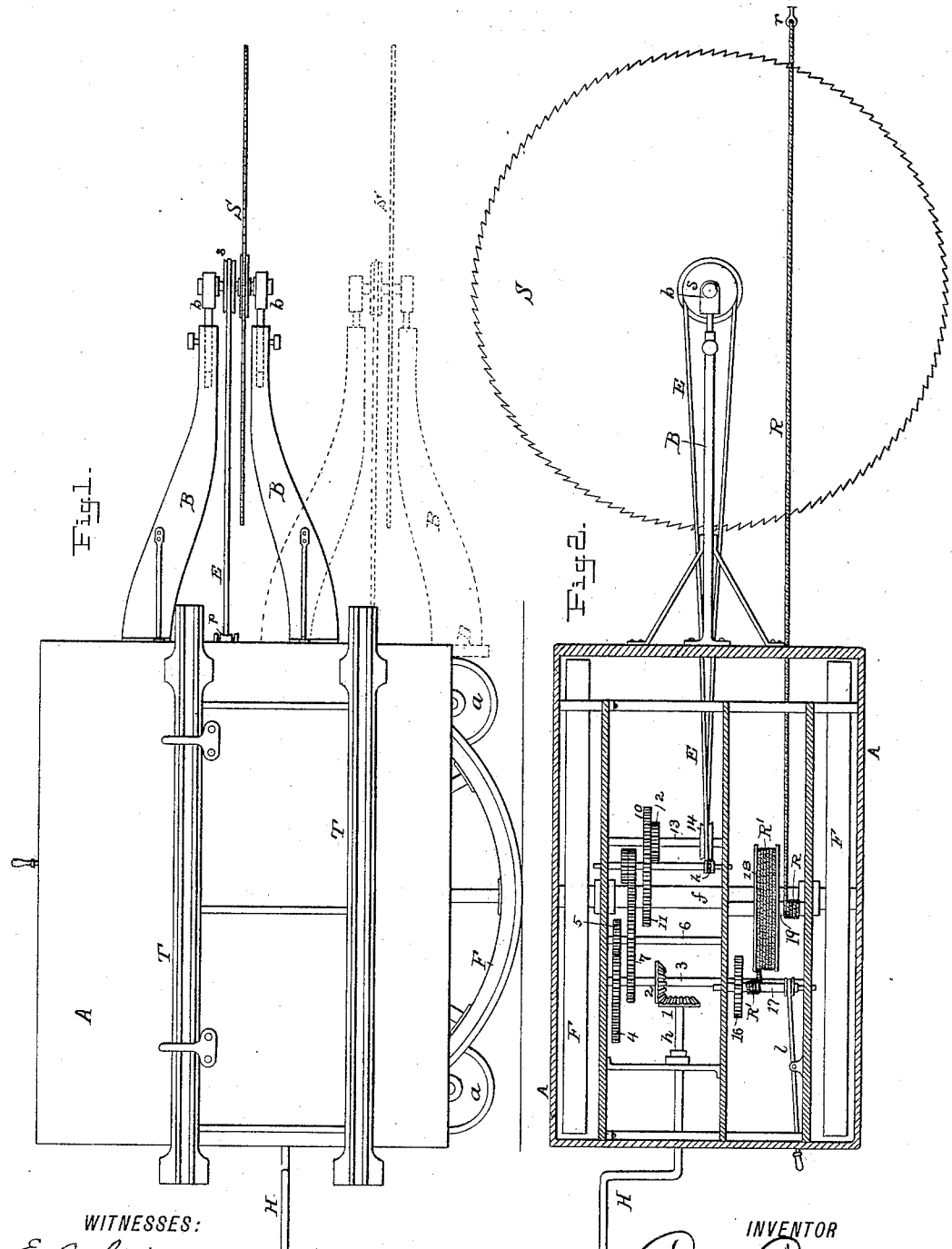

C. CURWEN.
PORTABLE SAWING MACHINE.

No. 431,445. Patented July 1, 1890.

WITNESSES:
E. J. Griswold
John Revell

INVENTOR
Camden Curwen
BY
Howson & Howson
ATTORNEY

UNITED STATES PATENT OFFICE.

CAMDEN CURWEN, OF STARKE, FLORIDA.

PORTABLE SAWING-MACHINE.

SPECIFICATION forming part of Letters Patent No. 431,445, dated July 1, 1890.

Application filed August 27, 1889. Serial No. 322,132. (No model.)

*To all whom it may concern:*

Be it known that I, CAMDEN CURWEN, a citizen of the United States, and a resident of Starke, Bradford county, Florida, have invented an Improved Portable Sawing-Machine, of which the following is a specification.

The object of my invention is to construct a portable sawing-machine which is adapted to be operated by hand-power for the felling of trees, sawing of logs, and other purposes.

Figure 3:
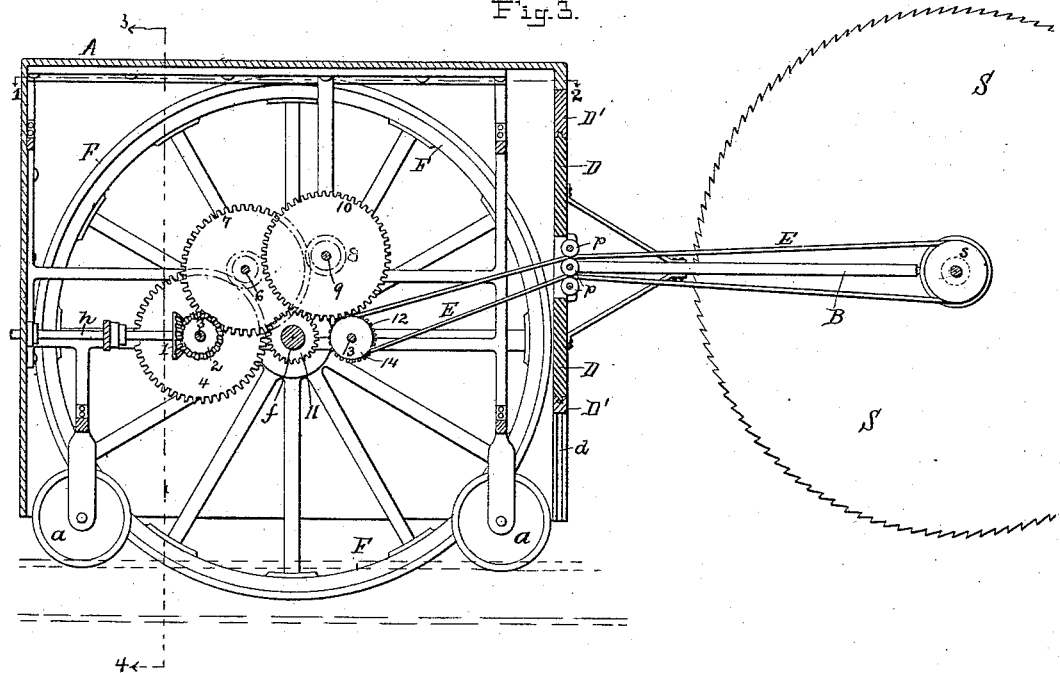
Figures 4, 5:
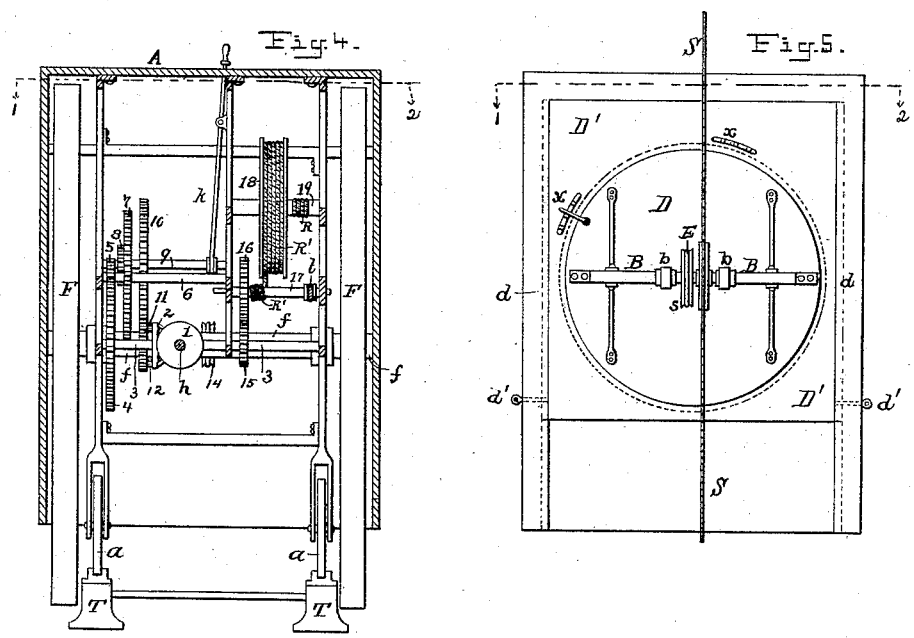

In the accompanying drawings, Figure 1 is a side elevation of a hand-power sawing-machine constructed in accordance with my invention and shown as arranged for purposes of transportation. Fig. 2 is a sectional plan view on the line 1 2, Figs. 3, 4, and 5, but with the saw turned to a position at right angles to that shown in the said Fig. 3. Fig. 3 is a vertical section of the improved sawing-machine and illustrating the saw in a vertical position for the sawing of logs. Fig. 4 is a transverse sectional elevation on the line 3 4, Fig. 3; and Fig. 5 is a front view of the machine corresponding with Fig. 3.

A is the frame of the machine, which is preferably of the inclosed character illustrated in the drawings, and this frame is mounted upon wheels $a$, which are adapted to run on portable tracks T, for the feeding forward of the machine when the latter is in operation in the felling of trees, sawing of logs, &c. When, however, the machine is not in use for sawing purposes, but is to be transported from place to place, the portable tracks T may be hung on the frame, as shown in Fig. 1, and the whole machine is then adapted to travel on a pair of large wheels F, which are brought into use for that purpose, but which, when the machine is in use for sawing, are brought into action as fly-wheels. These wheels F are mounted upon a central axis $f$, turning in bearings in the frame, and means are provided for throwing this fly-wheel shaft into and out of gear with the mechanism for driving the saw, as will be hereinafter described. The fly-wheels extend a short distance below the track-wheels $a$, so that when the latter are to be run off the track the large wheels F will rest upon the ground and support the machine; but, on the other hand, when the wheels $a$ are upon the portable track the machine will be elevated sufficiently to take the wheels F out of contact with the ground and leave them free to act as fly-wheels.

The saw S itself is mounted to turn with its axis in bearings carried by brackets B at the front of the machine. These brackets are secured to a front plate D, which can be adjusted vertically, in order to raise or lower the saw to different heights, as indicated in Fig. 1, and also in a rotary direction, in order to turn the saw to lie in a vertical or horizontal plane, as the work to be done may require. For this purpose the front plate D, which carries the saw, is mounted to turn in a slide D', which in turn can be adjusted vertically in guides $d$ in the front frame of the machine and held in any desired position vertically by suitable means, such as pins $d'$, or otherwise, Fig. 5. Suitable devices $x$, Fig. 5, may also be provided for locking the front plate D in position, so as to maintain the saw in the horizontal, vertical, or other plane in which it is desired to work.

In Figs. 1 and 2 the saw is shown as arranged in a horizontal plane; in Figs. 3 and 5 it is shown as arranged in a vertical plane.

Rotary motion is imparted to the saw from the driving mechanism within the frame of the machine by means of an endless rope or band E, which passes around a grooved pulley $s$ on the axis of the saw and around a pulley 14 on the shaft 13, turning in bearings in the frame.

In the front plate D of the machine guide-pulleys $p$ are provided for the driving band or rope.

In order to take up the slack of the driving-band as the vertical adjustment of the front plate may require, any suitable means may be provided, and in this instance I have shown the bearings $b$ for the axis of the saw as adjustable in the brackets B for that purpose.

I will now describe the gearing which I prefer to use for imparting the necessary high speed to the saw from the hand-crank or hand-wheel H at the rear of the machine. Although I have shown this hand-crank or hand-wheel at the rear of the machine, I may arrange it at any suitable point as convenience may dictate. The axis $h$ of this hand-wheel or hand-crank is adapted to suitable bearings in the frame, and has at its inner end a bevel-pinion 1, gearing into a corresponding bevel-wheel 2, preferably of the same diameter, upon a transverse shaft 3, turning in bearings in the frame. This shaft 3 also carries a wheel 4, gearing into a pinion 5 on the transverse shaft 6, which also carries a gear-wheel 7. This wheel 7 in turn gears with a pinion 8 on the transverse shaft 9, which carries a wheel 10, gearing into a pinion 12 upon the shaft 13, which carries the grooved pulley 14 for the driving band or rope E of the saw. I do not, however, wish to restrict myself to this precise arrangement of gearing or the number or relative diameters of the wheels, as they may be varied according to the speed which it may be desired to impart to the saw in proportion to the power applied to the driving-axis $h$.

As a convenient way of gearing the fly-wheel shaft $f$ with the driving mechanism, I provide the shaft $f$ with a pinion 11, which gears into the wheel 10 on the cross-shaft 9, and in order to provide for throwing the fly-wheels out of gear with the mechanism the shaft 9 may be adapted to be adjusted endwise by means of a suitable shifting-lever $k$, so as to permit the gear-wheel 10 to be disengaged at any time from the pinion 11. In order to do this without throwing any of the pinions or wheels of the driving mechanism out of gear with each other the pinions 8 and 12 may be made of double width, as shown in Fig. 2. While, therefore, the wheels 10 and pinion 11 are in gear, the large wheels F serve the purpose of fly-wheels in sawing operations; but when it is desired to arrange for the transportation of the machine from one place to another the wheel 10 and pinion 11 are thrown out of gear, so that the wheels F are then free from the driving mechanism and can be used as wheels on which the entire machine can be transported, as indicated in Fig. 1.

In order to provide for the forward motion of the machine in sawing operations—as, for instance, in tree-felling—I provide a simple form of feed mechanism which may be thrown into gear with the driving mechanism to advance the machine in proportion to the cutting of the saw. A suitable rope or band R is attached by a staple $r$, or other suitable fastening, to a tree or other fixed point, and the other end of this rope is coiled around the shaft 19, to be driven from the driving mechanism. In this instance the shaft 19 carries a drum 18. On this drum 18 is coiled a rope or band R', whose opposite end is coiled around a shaft 17. This shaft 17 carries a toothed wheel 16, gearing into a pinion 15 on an extension of the shaft 3. The shaft 17 may be moved in the direction of its length by means of a shifting-lever $l$ to throw the wheel 16 out of gear with the pinion 15. When the wheel 16 and pinion 15 are geared with each other and the rope is attached to a fixed point, as shown in Fig. 2, and above described, the feed-rope R will be gradually coiled onto the shaft 19 and the entire machine advanced forward upon the tracks T as the sawing proceeds. By throwing the wheel 16 out of gear with the pinion 15 the feed-motion may at any time be stopped.

I claim as my invention—

1. A portable tree felling or sawing machine, comprising a frame carrying a rotary saw, a hand crank or wheel, and gearing for imparting motion to the saw, a pair of fly-wheels extending below the frame, so that they can be used also for transportation, and means for throwing the fly-wheels into and out of gear with the driving mechanism.

2. A portable tree felling or sawing machine, comprising a frame containing the driving mechanism, in combination with an adjustable plate carrying the saw, and a band or rope for transmitting motion from the driving mechanism to the saw, the rope or band passing through guides in the adjustable plate, substantially as set forth.

3. A portable tree felling or sawing machine, comprising a frame and driving mechanism, in combination with a front plate carrying a rotary saw, the said front plate being adjustable vertically and in a rotary direction in the frame, and a flexible rope or band passing through guides in the said front plate for transmitting motion from the said driving mechanism to the saw.

4. The combination of a portable tree felling or sawing machine mounted on wheels with a portable track, on which it may be traversed in the sawing operation, and a pair of fly-wheels extending below the track-wheels to carry the machine when not sawing.

In testimony whereof I have signed my name to this specification in the presence of two subscribing witnesses.

CAMDEN CURWEN.

Witnesses:
R. F. ENSEY,
T. F. MURRAY.